United States Patent [19]

Morganeier

[11] 3,969,878
[45] July 20, 1976

[54] FRUIT PICKING TECHNIQUE

[76] Inventor: Herman C. Morganeier, 110 W. Williamson Ave., Harlingen, Tex. 78550

[22] Filed: Sept. 5, 1974

[21] Appl. No.: 503,391

[52] U.S. Cl. ............................................. 56/328 R
[51] Int. Cl.² ........................................ A01D 46/00
[58] Field of Search ......................... 56/328 R, 332

[56] References Cited
UNITED STATES PATENTS
3,460,330   8/1969   Black, Jr. ............................ 56/328 R
FOREIGN PATENTS OR APPLICATIONS
1,057,832   11/1953   France .............................. 56/328 R
561,866   4/1957   Italy .................................. 56/328 R Primary Examiner—Hugh R. Chamblee
Assistant Examiner—Daniel J. Leach
Attorney, Agent, or Firm—G. Turner Moller

[57] ABSTRACT

A fruit picker is disclosed which grasps the fruit by vacuum and then rotates the fruit to sever it from the tree. The vacuum is then broken and the fruit falls by gravity toward the ground from a location inside the periphery of the tree. Because the fruit impacts tree limbs during its descent toward the ground, its rate of descent is surprisingly slow. A net may be placed around the tree near ground level for receiving and collecting the fruit.

5 Claims, 11 Drawing Figures

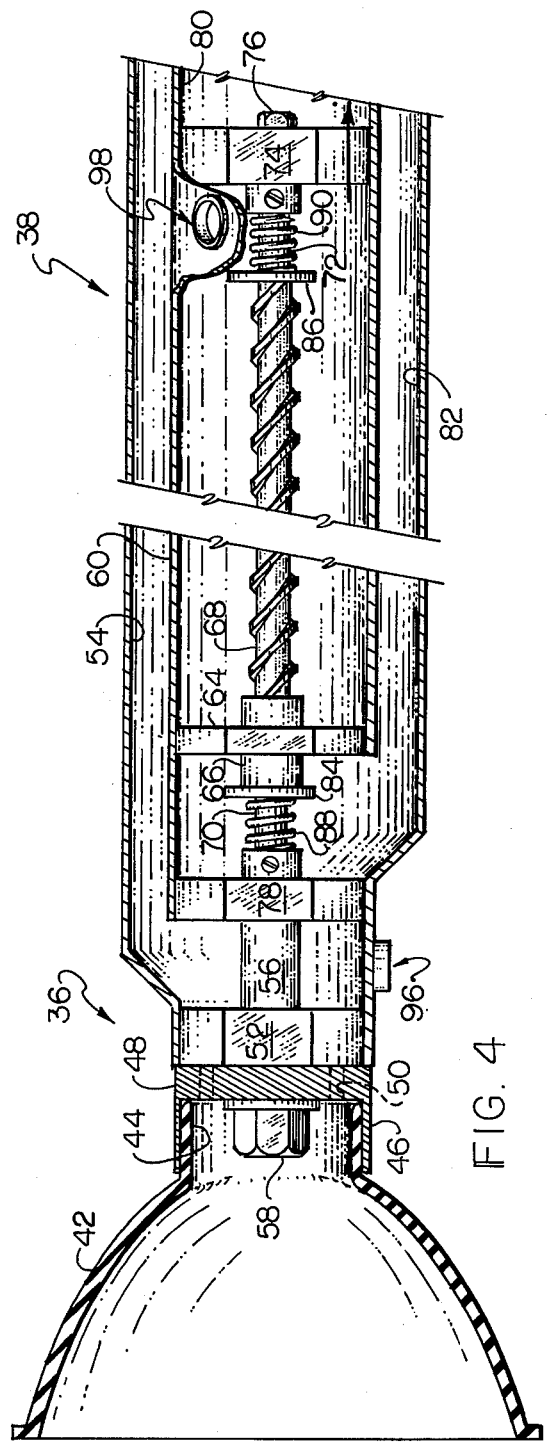
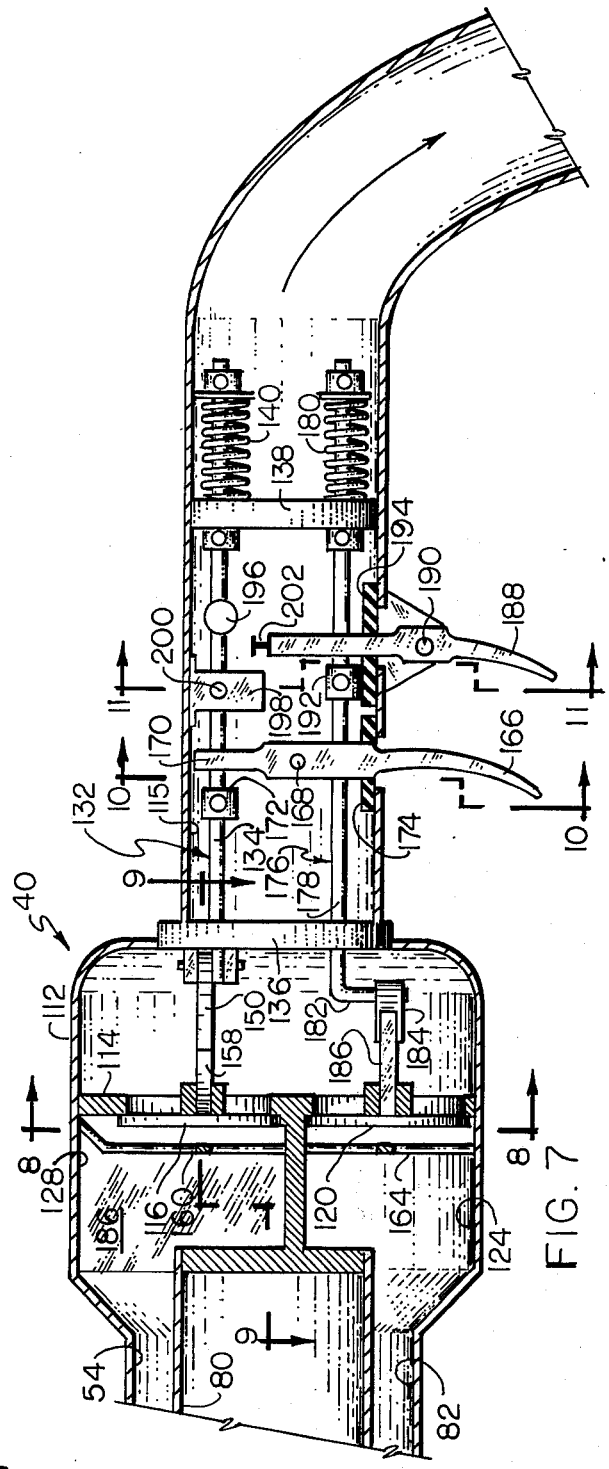
FIG. 4
FIG. 7

FRUIT PICKING TECHNIQUE

This invention relates to a vacuum operated fruit picking device which is particularly suited for picking citrus fruit.

At the present time, the general practice in the citrus industry is for the grove owner to contract with a broker or produce company who agrees to pay a given price per bushel of fruit and who employs the personnel necessary to pick the fruit. The grove owner accordingly has little or no control over the actual picking operation. The broker or produce company usually hires pickers on a piecework basis. The end result is that a substantial quantity of fruit is left on the tree, either near the top of the tree or at hard-to-reach locations inside the periphery of the tree. Although the quantity of fruit left on a tree varies substantially, it is not uncommon for one-half bushel of grapefruit to be left on each tree in a grapefruit grove.

A need accordingly exists for better means to assist in the harvesting of citrus fruit in order to rapidly harvest greater quantities of fruit in good condition per unit time. Specifically, it is desirable to harvest all or most of the hard-to-reach fruit that is out of reach, either that which is near the top of the tree or inside the periphery of the tree, and which is often left unpicked by piece rate workers.

The device of this invention is pneumatically operated and acts to grasp a fruit and then to rotate the fruit thereby breaking it from the stem. This concept of severing citrus fruit from its stem is shown in U.S. Pat. Nos. 2,775,088; 3,460,330; 3,473,312; 3,564,826; and 3,591,949. It will be noted that each of these disclosures handles the severed fruit by passing the same through the elongate vacuum applying and rotating mechanism into a tube for passage to a ground level location. Much of the difficulty in the aforementioned devices resides in the technique for moving the severed fruit through the picking device toward a ground level location.

The device of this invention operates in a substantially different fashion in handling the severed fruit. The technique of this invention relies to some extent upon a characteristic of citrus trees. Although citrus trees are called "trees", in appearance they are more nearly that of large bushes. For example, mature grapefruit trees are seldom taller than about twelve feet high and are typically of about the same diameter and present a dense tangle of limbs, leaves and fruit beginning a rather short distance from the ground and extending to tree top level. In accordance with the method of this invention, one merely releases the severed fruit inside the periphery of the tree. The descent of the fruit through the tree has the appearance of a pin-ball making its way through a pinball machine in the sense that it bounces off one limb to another during its fall. Because of the tangle of growth in a citrus tree, the rate of fruit descent toward ground level is not as great as one might at first blush surmise. A suitable net may be placed slightly above ground level beneath the tree to collect the severed fruit.

Another disclosure of interest is found in French Pat. No. 1,057,832.

In summary, one aspect of this invention comprises a device for picking a stem supported fruit of a generally uniform predetermined maximum size transverse to the stem axis, the device comprising an elongate frame having a fruit receiving end including an open ended cup smaller in size than the predetermined maximum size, means for applying a vacuum to the cup for grasping fruit therein, means for rotating the cup for severing the fruit from its source, and means for releasing the vacuum and allowing the fruit to fall by gravity from the cup.

In summary, another aspect of this invention comprises a method of harvesting a citrus fruit from a tree comprising the steps of placing a cup adjacent the fruit to be picked, applying a vacuum to the cup for temporarily grasping the fruit therein, rotating the cup for severing the fruit from the tree, releasing the vacuum and thereby releasing the fruit from the cup, dropping the severed fruit from the cup at a location inside the confines of the tree whereby the rate of descent of the fruit is reduced by impact with the tree, and collecting the fruit near ground level.

In the drawings:

FIG. 4 is an enlarged longitudinal cross-sectional view of the fruit receiving end of the device of FIG. 3;

FIG. 5 is a transverse cross-sectional view of the fruit picking device of FIG. 3, taken substantially along line 5—5 as viewed in the direction indicated by the arrows;

FIG. 7 is an enlarged longitudinal cross-sectional view of the control end of the fruit picking device of FIG. 3;

FIG. 8 is an enlarged transverse cross-sectional view of the control end of the fruit picking device of FIG. 7, taken substantially along line 8—8 thereof as viewed in the direction indicated by the arrows;

Figure 1:
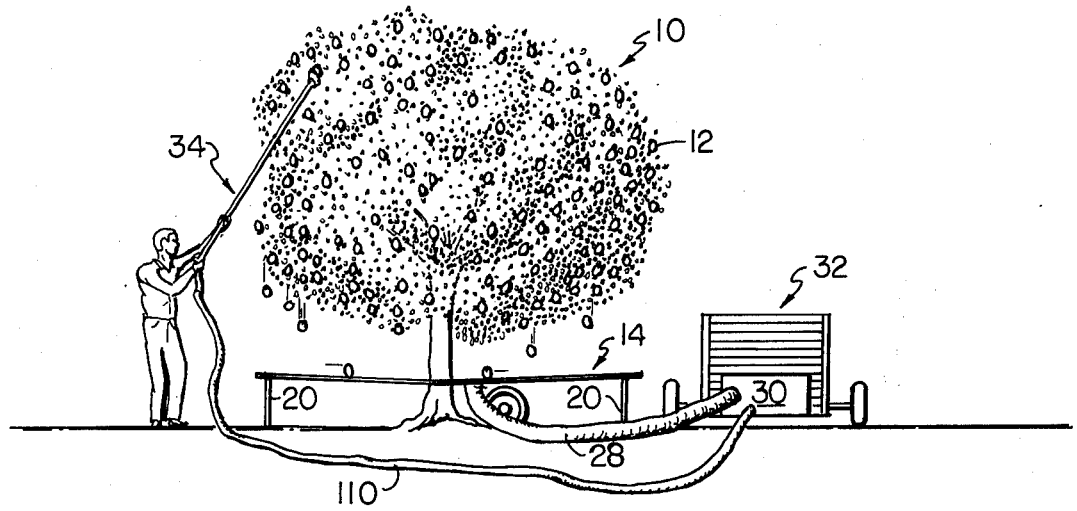
FIG. 1 is an overall view illustrating the fruit picking technique of this invention.
Figure 2:
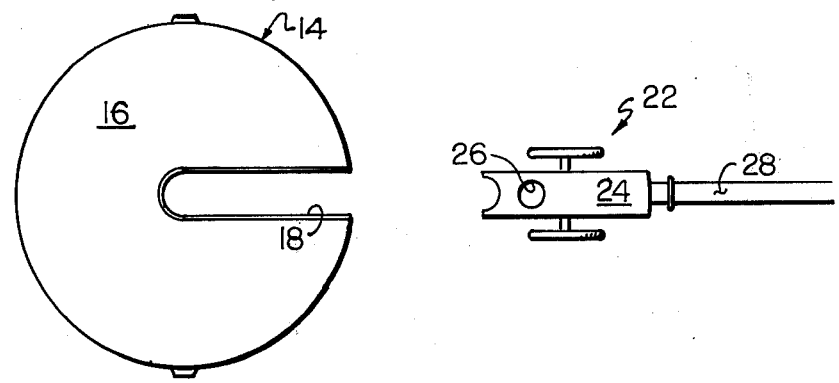
FIG. 2 is a top plan view of a net and fruit retrieving mechanism placed under the tree for collecting fruit falling thereonto.

Referring to FIGS. 1 and 2, there is illustrated a tree 10 bearing fruit 12 which, in accordance with this invention, will be severed from the tree and dropped onto a collection net 14. As best illustrated in FIG. 2, the collection net 14 comprises a major fruit receiving segment 16 defining a slot 18 for receiving the tree trunk. The section 16 is supported from ground level by a plurality of suitable legs 20. Filling the slot 18 is a cart 22 comprising a minor fruit receiving segment 24 having a fruit receiving opening 26 therein. A vacuum hose 28 connects the opening 26 to a vacuum source 30 carried on a trailer or other suitable vehicle 32.

As will become more fully apparent hereinafter, the fruit 12 is severed from the tree 20 by manipulation of a fruit picker or tool 34. Upon severing, the fruit 12 is dropped from the end of the tool 34 and falls by gravity onto the collection net 14. The collection net 14 is sloped to roll the fruit toward the opening 26. As fruit passes through the opening 26 into the hose 28, the vacuum applied by the source 30 acts to transport the fruit through the hose 28 into a storage compartment on the trailer 32.

Figure 3:
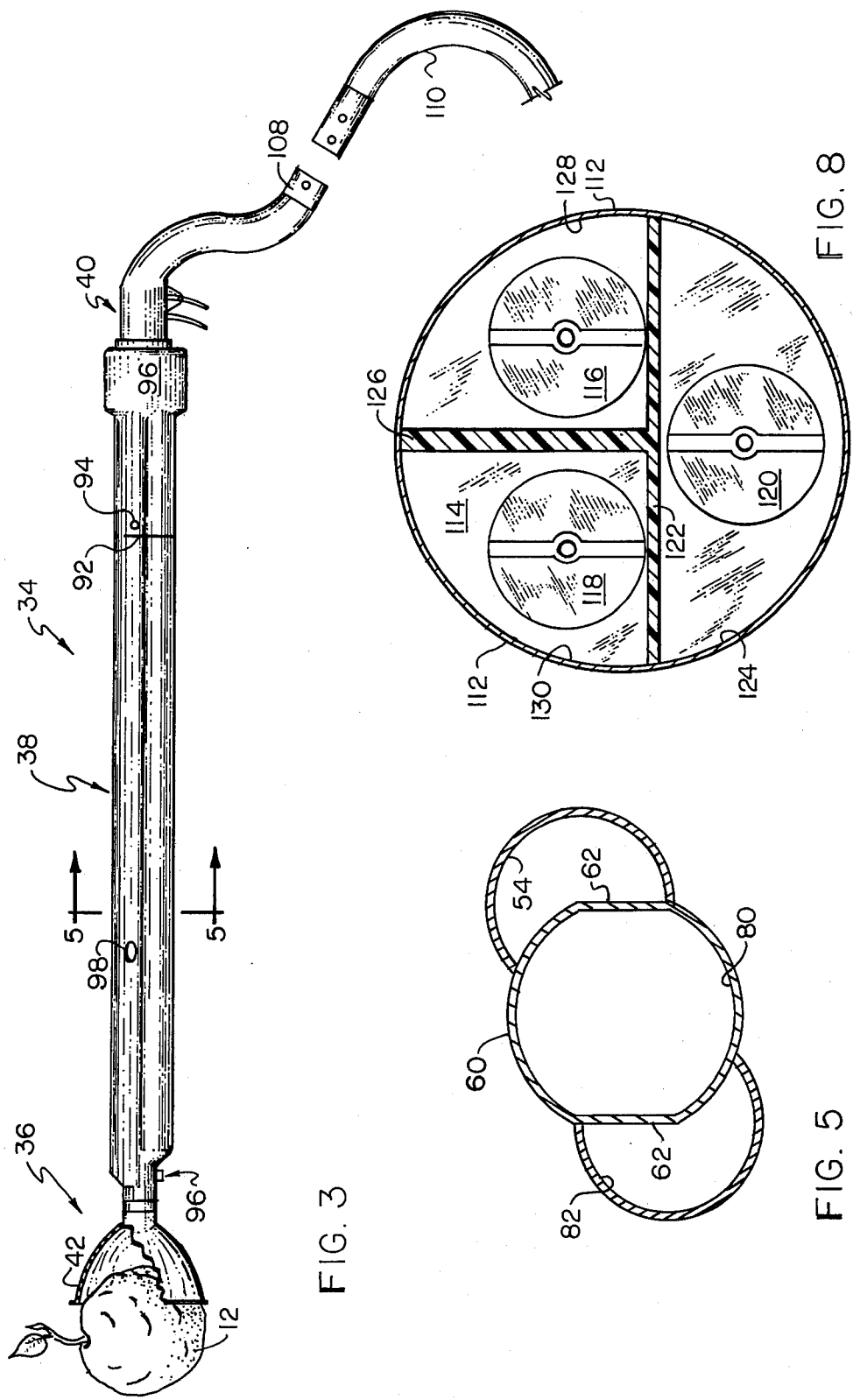
FIG. 3 is a side elevational view, certain parts being broken away for clarity of illustration, illustrating a fruit picking device in accordance with this invention.

Referring to FIGS. 3–11, the fruit picker 34 is illustrated as comprising a fruit receiving end 36, a central or extendable section 38 and a control section 40. The fruit receiving end 36 of the tool 34 is best illustrated in FIGS. 3 and 4 and comprises a bodily flexible cup 42 through which a vacuum is applied for grasping the fruit 12. It is highly desirable that the cup 42 be sized, shaped or configured so as not to hold the fruit 12 therein by gravity so that when the vacuum applied thereto is broken, the fruit 12 will fall out of the cup 42 toward the net 14. Accordingly, in picking a fruit which is substantially spherical, for example, grapefruit or oranges, the cup 42 may be sized to be slightly smaller than the maximum fruit diameter. In the event that one is picking a fruit which is not substantially spherical, for example lemons, the cup 42 should be sized to be slightly smaller than the maximum fruit dimension which is presented to the cup 42.

As illustrated in FIG. 4, the cup includes a neck 44 captivated inside a cylindrical wall 46 carried by a thrust plate 48 having openings 50 therethrough. As will be more fully apparent hereinafter, the openings 50 communicate through a bearing block 52 to an air passage 54. It will be apparent that the application of a vacuum to the air passage 54 will cause the fruit 12 to be grasped by the cup 42 thereby temporarily fixing the fruit 12 to the fruit receiving end 36 of the tool 34.

It is well known in the prior art that fruits can be picked more easily by simultaneously pulling on the fruit and rotating the same. To this end, the fruit receiving end 36 is rotatably mounted relative to the central tool section 38. There is accordingly provided a shaft 56 extending through the bearing block 52 and the thrust plate 48 with a nut 58 captivating the thrust plate 48 to the shaft 56. It will accordingly be apparent that rotation of the shaft 56 will cause rotation of the fruit receiving cup 42.

The central or extendable section 38 comprises an elongate tube 60 which is circular in cross section except for a pair of opposed flats 62 as shown in FIG. 5. Mounted for reciprocation inside the tube 60 is a complimentarily figured piston 64 having a central internally threaded hub 66 receiving a worm gear 68 which includes an unthreaded section 70, 72 at opposite ends thereof. The unthreaded section 70 is fixed to the shaft 56 while the unthreaded section 72 is mounted in a bearing block 74 by a suitable nut 76. There may be provided an additional bearing block 78 for supporting the worm gear 68 and for sealing about the exterior of the shaft 56 and the interior of the tube 60.

It will be apparent that reciprocation of the piston 64 toward and away from the fruit receiving end 36 causes rotation of the worm gear 68 thereby rotating the shaft 56 and the fruit receiving cup 42. To this end, the bearing block 74 is of the non-sealing variety or provides suitable openings therethrough to allow air movement adjacent the piston 64 into a passage 80 leading toward the control section 40. The central section 38 also provides a third passage 82 leading from the opposite side of the piston 64 toward the control section 40. It will accordingly be apparent that the application of a vacuum on the right side of the piston 64 as viewed in FIG. 4 will cause the same to move toward the right and thereby rotate the worm gear 68, the shaft 56 and the fruit receiving cup 42 in order to sever the fruit 12 from the tree. Similarly, the application of a vacuum to the passage 82 causes the piston 64 to move to the left and thereby return to the position illustrated in FIG. 4.

It may be desirable to provide some shock absorbing mechanism for the piston 64 at its limits of travel. To this end, there is provided an abutment 84, 86 loosely mounted on opposite ends of the worm gear 68 and a spring 88, 90 for biasing the abutments 84, 86 toward the piston 64. As the piston 64 approaches its limit of travel, the central hub 66 engages one of the plates 84, 86 and compresses its associated spring 88, 90 in order to minimize any shocks created.

It is apparent that it may by desirable under circumstances to make the tool 34 longer in order to reach fruit at great heights. To this end, the central section 38 may be separable as indicated by a parting line 92 in FIG. 3. The manipulation of a suitable latch 94 will allow an additional piece of tubing to be inserted into the central section 38 thereby making it longer.

Figure 6:
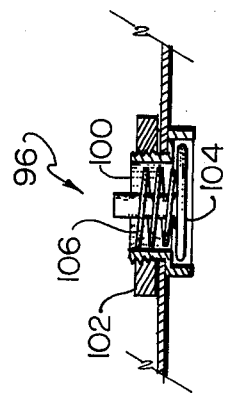
FIG. 6 is an enlarged view of a valve utilized in the fruit picker of this invention.

Referring to FIG. 4, the central section 38 also comprises first and second valves 96, 98 which act to break the vacuum inside the tool 34 when desired. The valves 96, 98 are substantially identical and comprise, as illustrated in FIG. 6, a housing 100 which is captivated to the side wall of the tool 34 by a suitable nut 102. The housing 100 provides a seat for valve element 104 which is biased toward an open position by a spring 106. The valve element 104 is accordingly normally spaced from the valve seat so that atmospheric pressure exists inside the tool 34. When the passage 54 is connected to the inlet side of a suitable vacuum pump or fan, the valve element is drawn against the bias of the spring 106 into sealing engagement with the housing 100. When the connection between the passage 54 and the vacuum source is terminated, the spring 106 biases the valve element 104 outwardly to admit air into the passage 54 and thereby break the vacuum in the cup 42. The valve 98 works substantially the same to provide air entry into the passage 80. As will be apparent from FIG. 3, the valve 98 communicates between the passage 80 and the atmosphere.

Referring to FIGS. 7–11, the control section 40 of the fruit picker 34 is illustrated in greater detail. Basically, the control section 40 comprises a connector 108 for attachment to a hose 110 leading to the vacuum source 30 as shown in FIG. 1 together with suitable valves and actuators for selectively connecting the vacuum source 30 to the passages 54, 80, 82.

To these ends, the control section 40 comprises a valve housing 112 receiving a valve plate 114 which divides a common inlet air passage 115 from the air passages 54, 80, 82. In valving relation with the plate 114 are three valves 116, 118, 120 respectively controlling the passages 54, 80, 82. As shown best in FIG. 8, a plate 122 defines with the valve housing 112 a compartment 124 into which the passage 82 opens as illustrated in FIG. 7. A plate 126 connects the valve housing 112 to the plate 122 thereby providing a pair of compartments 128, 130 into which the valves 116, 118 open. As shown best in FIG. 9, the passage 54 opens into the compartment 128 while the passage 80 opens into the compartment 130. It will accordingly be seen that the valves 116, 118, 120 selectively control air flow through the passages 54, 80, 82.

The valves 116, 118 are actuated by a common mechanism 132 comprising a rod 134 mounted for reciprocating movement between a pair of brackets 136, 138. A return spring 140 is provided to return the rod 134 to the valve-closed position. The opposite end of the rod 134 provides a crosspiece 142 positioned to engage an abutment 144, 146 on a cam 148, 150. The cams 148, 150 are mounted by respective pins 152, 154 for movement in a path engaging a cam follower 156, 158 respectively carried by the valves 116, 118. It will accordingly be seen that movement of the rod 134 to the left in FIG. 9 causes the crosspiece 142 to engage the abutments 144, 146 thereby rotating the cams 148, 150 toward and into engagement with the cam followers 156, 158 thereby moving the valves 116, 118 off of their respective seats.

Figure 9:
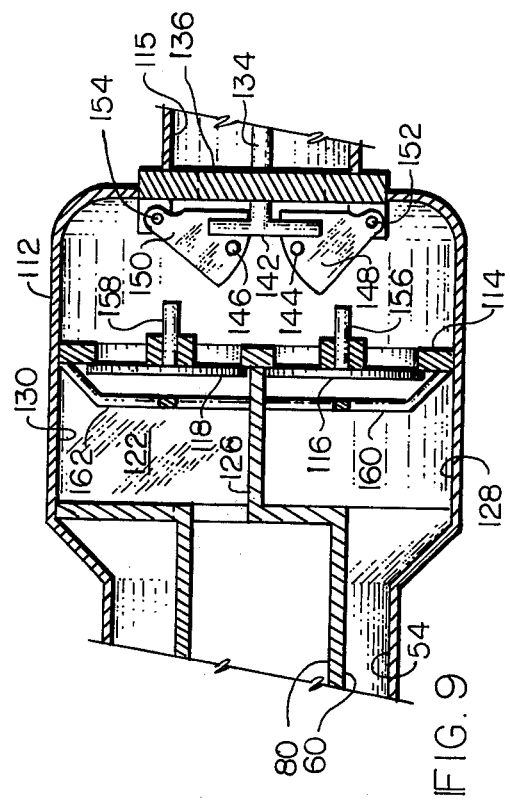
FIG. 9 is a cross-sectional view of the device of FIG. 7, taken substantially along line 9—9 thereof as viewed in the direction as indicated by the arrows.

It will be apparent from FIG. 9 that the valves 116, 118 are exposed during operation to a lower pressure on the right side thereof than on the left side thereof. The valves 116, 118, as as well as the valve 120 as will be apparent hereinafter, are biased by differential air pressure into a valve-closed position during operation. A wire valve cage 160, 162, 164 is positioned adjacent its respective valve 116, 118, 120 to prevent excessive valve movement away from the plate 114 when the device 34 is not in use.

It is desirable to assure that the fruit 12 is firmly grasped by the cup 42 before commencing rotation thereof. Accordingly, it is desirable to first open the valve 116 and reduce the air pressure in the passage 54 before opening the valve 118 which obviously controls the commencement of rotation of the fruit receiving cup 42. To this end, the cams 148, 150 may comprise a delay mechanism such that the cam 148 contacts the cam follower 156 before the cam 150 contacts the cam follower 158.

Figure 10:
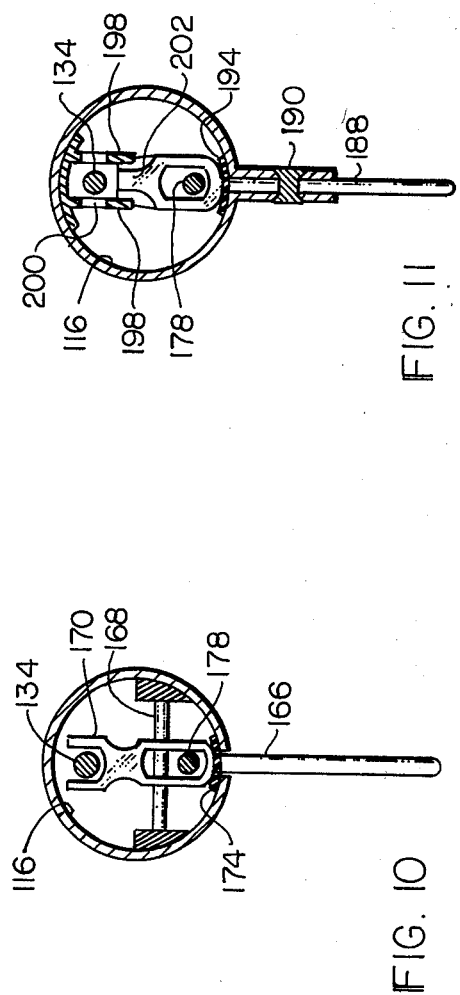
FIG. 10 is a cross-sectional view of the device of FIGS. 3–7 as taken along line 10—10 in FIG. 7 as viewed in the direction indicated by the arrows.

As shown best in FIGS. 7 and 10, the valve actuating rod 110 is conveniently manipulated by a trigger 166 journaled by a shaft 168 and providing a bifurcated upper end 170 straddling the rod 134. Movement of the end 170 is carried by the rod 134. It will accordingly be apparent that pulling on the trigger 166 causes the rod 134 to move to the left in FIG. 7 thereby opening the valves 116, 118. It is also apparent that release of the trigger 166 allows the return spring 140 to retract the rod 134 and trigger 166 thereby moving the cams 148, 150 out of engagement with the cam followers 156, 158. Since lower air pressure exists in the passage 116, the valves 116, 118 move into sealing engagement with the plate 114. A rubber gasket 174 conveniently prevents a vacuum loss from around the trigger 166.

The control section 40 also comprises a mechanism 176 for operating the valve 120 for lowering air pressure in the passage 82. The valve actuating mechanism 176 comprises a rod 178 mounted by the brackets 136, 138 for reciprocating movement. A spring 180 is provided to bias the rod 178 in a valve-closed direction. The opposite end of the rod 178 provides a downturned portion 182 carrying a wedge-shaped element 184 on the end thereof for engaging a follower 186 carried by the valve 120. It will be evident that movement of the rod 120 to the left in FIG. 7 moves the valve 120 off of its seat.

Figure 11:
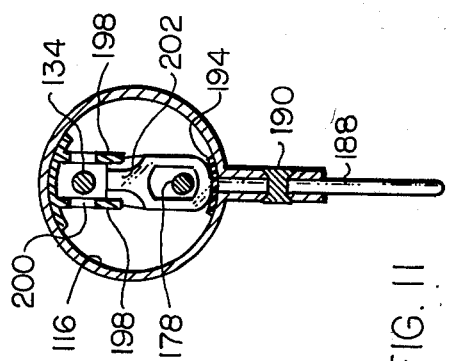
FIG. 11 is a cross-sectional view of the device of FIGS. 3–7 taken substantially along line 11—11 of FIG. 7 as viewed in the direction as indicated by the arrows.

As shown in FIGS. 7 and 11, a convenient device for manipulating the rod 178 is a trigger 188 mounted by a rivet 190 for rotation into engagement with an abutment 192 carried by the rod 178. A rubber gasket 194 conveniently prevents a vacuum loss from around the trigger 188.

It may be desirable to provide means for temporarily holding the valves 116, 118 open rather than relying on the user to keep the trigger 166 pulled. To this end, there is provided a ball 196 fixed to the rod 134 for movement into engagement between a pair of depending legs 198 as seen in FIGS. 7 and 11. The legs 198 provide a pair of aligned openings or recesses 200 into which the ball 196 moves on leftward movement of the rod 134 in FIG. 7. Because the legs 198 are inherently resilient, the ball 196 is retained between the legs 198 thereby holding the valves 116, 118 open. In order to release the ball 196 from between the legs 198, the upper end of the trigger 188 is provided with a wedge element 202 for entering between the legs 198 and spreading the same. As the legs 198 are moved relatively away from one another, spring 140 is able to retract the ball 196 from between the openings 200.

In operation, the party picking fruit from the tree 10 moves the collection net 14 around the base of the tree as allowed by the slot 18. The cart 22 is then wheeled into position to provide a device for gathering the severed fruit. The vacuum hoses 28, 110 are connected to the vacuum source 30. The fruit picker 34 is attached to the vacuum hose 110 and operations are ready to commence.

The user places the fruit receiving cup 42 around part of the fruit to be picked, as illustrated in FIG. 3. The user pulls the trigger 166 which first opens the valve 116 for applying a partial vacuum to passage 54. By opening the valve 116, the fruit 12 is temporarily grasped by the cup 42. Further pulling on the trigger 166 causes the valve 118 to open which controls air flow between the passage 80 and the tube 60. Opening the valve 118 causes a reduction in air pressure on the right side of the piston 64 as seen in FIG. 4. Since the left side of the piston 64 is at atmospheric pressure, the piston 64 is moved to the right in FIG. 4 thereby rotating the worm gear 68. Rotation of the worm gear 68 causes rotation of the fruit receiving cup 42. It will be apparent that the stem connecting the fruit 12 to the tree 10 is subjected to both a rotative and a tensile force which acts to sever the fruit 12 cleanly from the tree 10.

After the fruit 12 is severed from the tree, the operator releases the trigger 166 which allows the valves 116, 118 to close under the impetus of the spring 140. The valves 96, 98 open to admit air into the passages 54, 80 respectively. The vacuum inside the fruit receiving cup 42 is broken whereby the fruit 12 falls by gravity. The fruit 12 is released inside the periphery of the tree 10. Since citrus trees typically present a dense tangle of limbs, leaves and fruit inside the periphery thereof, the descent of the fruit through the tree has the appearance of a pinball making its way through a pinball machine in the sense that it bounces off one limb to another during its fall. The rate of fruit descent toward the net 14 is accordingly not as great as one might at first blush surmise. Consequently, fruit can be retreived from the net which is not bruised or otherwise damaged even though it may have fallen for a total distance of ten feet, for example. Fruit on the net 14 rolls until it enters the opening 16 whereupon it passes through the conduit 28 into the trailer 32.

The operator then momentarily pulls the trigger 188 which opens the valve 120 and lowers air pressure in the passage 82. Accordingly, there is a pressure differential across the piston 64 to drive the same to the left in FIG. 4 in order to assume the position there illustrated. The tool 34 is accordingly in condition to sever another fruit.

I claim:

1. A device for picking a stem supported fruit of a generally uniform predetermined mixture size transverse to the stem axis, the device comprising:
   an elongate frame having a fruit receiving end including an open ended cup smaller in size than the predetermined maximum size;
   a vacuum pneumatic motor for rotating the cup for severing the fruit from its source;
   means for selectively applying a vacuum to the cup for grasping fruit therein prior to applying a vacuum to the motor; and
   means for releasing the vacuum and allowing the fruit to fall by gravity from the cup.

2. A device for picking a stem supported fruit, comprising:
   an elongate frame having a fruit receiving end including an open ended cup;
   means for applying a vacuum to the cup for grasping fruit therein;
   means for rotating the cup for severing the fruit from its source including a pneumatic motor having an internally threaded piston and means mounting the piston for reciprocating non-rotative movement, and an exteriorally threaded shaft received in the piston, means connecting the shaft and the cup for rotating the cup upon reciprocation of the shaft, and means for applying a differential air pressure across the piston; and
   means for releasing the vacuum and allowing the fruit to fall by gravity from the cup.

3. The device of claim 2 wherein the differential air pressure applying means comprises means for applying a vacuum to one side of the piston for moving the piston in one direction.

4. The device of claim 3 wherein the differential air pressure applying means comprises means for applying a vacuum to the opposite side of the piston for moving the piston in the opposite direction.

5. The device of claim 1 wherein the selective applying means comprises
   a first air passage leading to the cup and having a first valve therein;
   a second air passage leading to the motor and having a second valve therein;
   a single actuator and means driven by the actuator for first opening the first valve and then opening the second valve.

* * * * *